United States Patent
Fukuhara et al.

(10) Patent No.: US 6,328,316 B1
(45) Date of Patent: Dec. 11, 2001

(54) RUBBER SEAL FOR SEMI-DYNAMIC APPLICATIONS

(75) Inventors: Shuzo Fukuhara, Newark, DE (US); John Michael Legare, San Ramon, CA (US)

(73) Assignee: DuPont Dow Elastomers, L.L.C., Wilmington, DE (US)

( * ) Notice: Subject to any disclaimer, the term of this patent is extended or adjusted under 35 U.S.C. 154(b) by 0 days.

(21) Appl. No.: 09/481,320

(22) Filed: Jan. 11, 2000

Related U.S. Application Data

(60) Provisional application No. 60/115,581, filed on Jan. 12, 1999.

(51) Int. Cl.$^7$ .................................................. F16J 15/02
(52) U.S. Cl. ........................ 277/644; 277/626; 277/650; 277/910; 277/945
(58) Field of Search .................... 277/626, 644, 277/648, 650, 910, 945

(56) References Cited

U.S. PATENT DOCUMENTS

| | | | |
|---|---|---|---|
| 1,733,180 | * 10/1929 | Biedermann | 251/120 |
| 3,558,097 | * 1/1971 | DeFrees | 251/88 |
| 3,575,431 | * 4/1971 | Bryant | 277/641 |
| 3,584,889 | * 6/1971 | Sheets | 277/626 |
| 3,630,485 | * 12/1971 | Williams . | |
| 3,895,815 | 7/1975 | Panigati . | |
| 3,910,555 | * 10/1975 | Bertrem et al. | 251/306 |
| 4,035,565 | 7/1977 | Apotheker et al. . | |
| 4,061,459 | * 12/1977 | Parmann | 425/403 |
| 4,150,836 | 4/1979 | Walker . | |
| 4,281,092 | 7/1981 | Breazeale . | |
| 4,487,903 | 12/1984 | Tatemoto et al. . | |
| 4,529,784 | 7/1985 | Finlay . | |
| 5,482,297 | 1/1996 | Burns et al. . | |
| 5,579,718 | 12/1996 | Freerks . | |
| 5,629,657 | 5/1997 | Bayorgeon et al. . | |
| 5,789,489 | 8/1998 | Coughlin et al. . | |
| 5,936,060 | 8/1999 | Schmiegel . | |

FOREIGN PATENT DOCUMENTS 0 872 495 A1    10/1998  (EP) .............................. C08F/214/26

* cited by examiner

*Primary Examiner*—Anthony Knight
*Assistant Examiner*—Alison K. Pickard

(57) ABSTRACT

This invention is directed to a seal for installation into an annular groove of dovetail configuration that has a mouth, two side walls depending from the mouth that extend away from each other and a base wall that is connected to the two side walls thereby forming the dovetail configuration. The seal of this invention viewed in cross section comprises an element having a multi-arcual surface and a substantially flat surface, the multi-arcual surface has distinct first, second and third convex arcual surfaces;

the first convex arcual surface of the seal is sized and shaped for positioning in the mouth of the annular groove of the dovetail configuration and is directly connected to the substantially flat surface; the substantially flat surface is directly connected to the second arcual convex surface that is in turn directly connected to a first concave arcual surface that is directly connected to the third convex arcual surface; the second and third convex arcual surfaces being shaped and sized so as to be in contact with the base wall of the annular groove of the dovetail configuration when the seal is seated in the groove; the third convex arcual surface and the first arcual convex surface are directly connected by a second concave arcual surface and the region defined by this second concave arcual surface forms an insertion surface of approximate complementary shape to the mouth of the annular groove for mating engagement with the side walls of the annular groove during insertion of the seal into the groove.

6 Claims, 2 Drawing Sheets

RUBBER SEAL FOR SEMI-DYNAMIC APPLICATIONS

This application claims the benefit of U.S. Provisional Application No. 60/115,581, filed Jan. 12, 1999.

FIELD OF THE INVENTION

This invention relates to a rubber seal element designed for semi-dynamic applications that utilize a dovetail shaped groove configuration.

BACKGROUND OF THE INVENTION

O-rings made of natural or synthetic rubber are well known for use as sealing devices for the containment of various fluids including chemical solvents, gases and plasmas. The type of rubber used in a seal is chosen based on the type of fluid to be sealed and the temperature of the environment in which the seal is to be employed. Seals for corrosive fluids and strong solvents, or for high temperature applications often require the rubber to be a fluoroelastomer or perfluoroelastomer.

In semi-dynamic applications, wherein one of the surfaces in contact with the O-ring moves, the O-ring can shift and twist in its seat (i.e. the groove in which it is mounted) or the O-ring may be physically damaged or broken and fluid can then move around the seal and cause a leak. In the past, this problem has been partially solved by designing the seat to have a dovetail shaped cross-section, which more firmly holds the O-ring in place. However, it can be very difficult to install a seal into a dovetail shaped groove without damaging or twisting it. A seal which is damaged during installation or which is twisted in its seat during installation or in use can fail (i.e. leak) immediately or may have a shortened useful lifetime. Therefore, it would be an advantage to have a rubber seal which may easily be installed into a dovetail shaped seat and which, when installed, provides excellent semi-dynamic sealing properties.

SUMMARY OF THE INVENTION

This invention is directed to a seal for installation into an annular groove of dovetail configuration that has a mouth, two side walls depending from the mouth that extend away from each other and a base wall that is connected to the two side walls thereby forming the dovetail configuration. The seal of this invention viewed in cross section comprises an element having a multi-arcual surface and a substantially flat surface, the multi-arcual surface has distinct first, second and third convex arcual surfaces;

the first convex arcual surface of the seal is sized and shaped for positioning in the mouth of the annular groove of the dovetail configuration and is directly connected to the substantially flat surface;

the substantially flat surface is directly connected to the second arcual convex surface that is in turn directly connected to a first concave arcual surface that is directly connected to the third convex arcual surface; the second and third convex arcual surfaces being shaped and sized so as to be in contact with the base wall of the annular groove of the dovetail configuration when the seal is seated in the groove; the third convex arcual surface and the first arcual convex surface are directly connected by a second concave arcual surface and the region defined by this second concave arcual surface forms an insertion surface of approximate complementary shape to the mouth of the annular groove for mating engagement with a side wall of the annular groove during insertion of the seal into the groove.

DETAILED DESCRIPTION OF THE INVENTION

The present invention is an easy to install generally annular rubber seal element useful for semi-dynamic sealing applications which utilize a seal seat having a dovetail shaped groove configuration. By "generally annular" it is meant that the seal element of this invention need not be a circular ring, but may include, for instance, square or rectangular rings. Specific applications of the seals of the present invention include, but are not limited to, slit valve doors and gate valves.

It should be understood that the seal of this invention is made from natural or synthetic rubber and is generally annularly shaped. Fluoroelastomers or perfluoroelastomers are preferred rubbers for seals to be employed in corrosive or high temperature environments. Perfluoroelastomers are especially preferred in high temperature, corrosive chemical and plasma environments such as those found in semiconductor manufacture. However, one skilled in the art readily recognizes that other natural or synthetic rubbers could be used, depending on the resistance of the rubber to the fluid to be sealed and the temperature of the environment in which the seal is to be employed.

Figure 1:
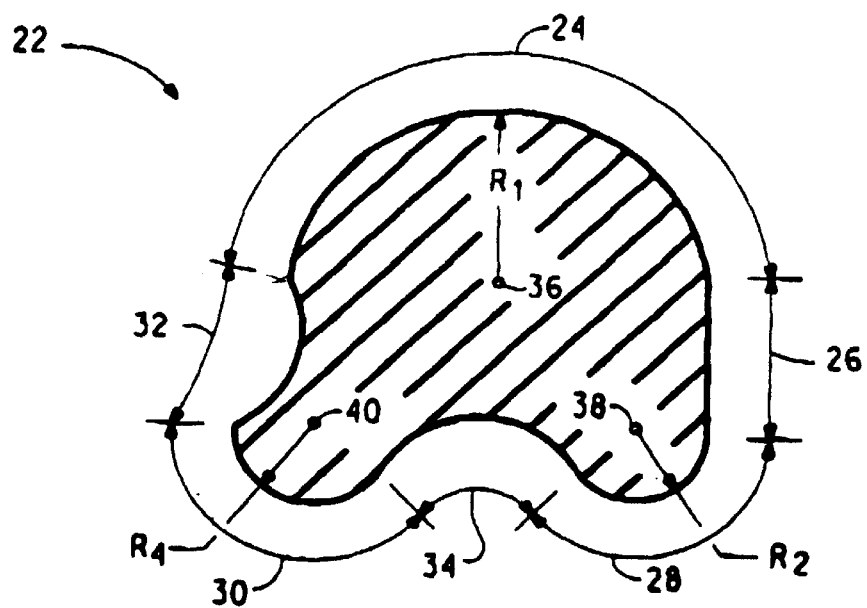
FIG. 1 is a cross-sectional view of a seal element of the present invention.

FIG. 1 shows a cross-section of the seal element 22 of the present invention that has five generally arcual surfaces. The first arcual surface 24 is convex. Substantially flat surface 26 separates the first arcual surface 24 from second convex arcual surface 28. The third arcual surface 34 is concave and separates second convex arcual surface 28 from fourth arcual surface 30. Fourth arcual surface 30 is convex. The fifth arcual surface 32 is concave and separates the first and fourth arcual surfaces from each other.

As can be seen in FIG. 1, the first arcual surface has a center 36 and a radius $R_1$. The second arcual surface 28 has a center 38 and a radius $R_2$. The fourth arcual surface 30 has a center 40 and a radius $R_4$. Centers 36, 38 and 40 are offset from each other, forming the points of a triangle, with center 36 at the apex. Radius $R_1$ is greater than either Radius $R_2$ or Radius $R_4$. Radii $R_2$ and $R_4$ are of similar size and may be equal, but in any case are less than $R_1$. In the seal element of the present invention, the length of arcual surface 24 is greater than that of either arcual surfaces 28 or 30.

Figure 2:
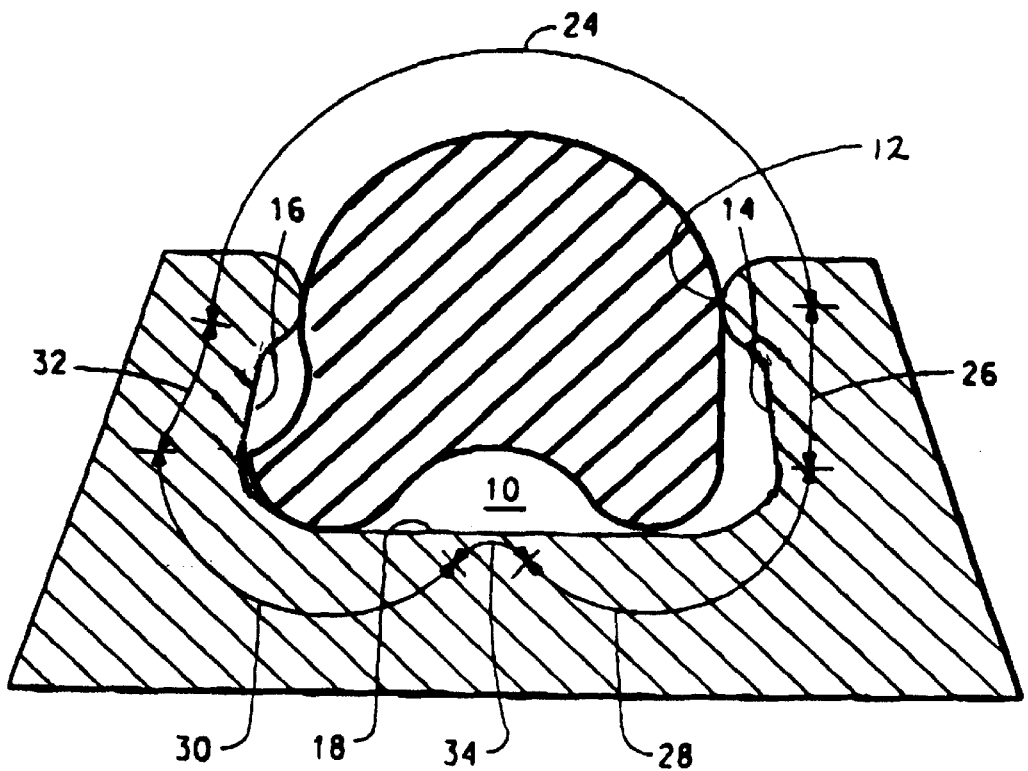
FIG. 2 is a cross-sectional view of a seal element of the present invention positioned within a dovetail shaped groove.
Figure 3:
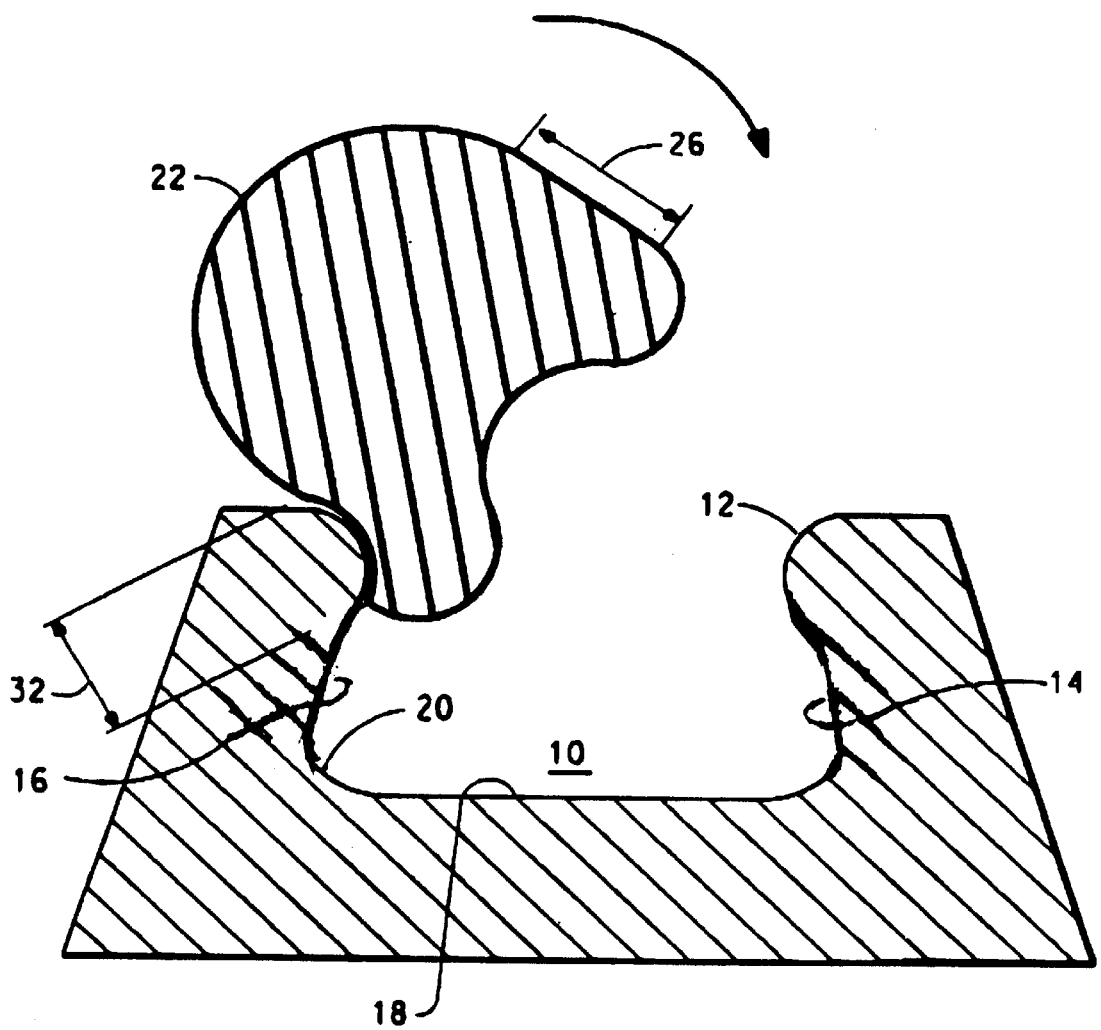
FIG. 3 is a cross-sectional view of a seal element of the present invention positioned for installation within a dovetail shaped groove.

The sealing element of the present invention is designed to sit in a dovetail shaped annular groove 10 as shown in FIGS. 2 and 3. The groove has an opening or mouth 12, first and second side walls 14, 16 and an axial base 18 that extends between the side walls 14, 16. The dovetail shape of groove 10 is obtained by having side walls 14, 16 extend toward each other as each side wall 14, 16 respectively, approaches the mouth 12 of the groove. As shown in FIG. 2 and 3, at least one or both side walls 14, 16 are at an angle of less than 90 degrees with respect to the base wall. Also, typically, at least one of the side walls 14, 16 meets the base wall 18 at a generally inwardly rounded surface 20, rather than at a sharp angle.

One skilled in the art will readily recognize that the overall size of the sealing element of the present invention, as well as the size of the arcual portions and radii $R_1$, $R_2$, $R_4$ will be determined by the size and shape of the dovetail shaped groove in which the seal is to be positioned.

When the seal is positioned in groove 10 without compression (as shown in FIG. 2), a substantial portion of first arcual surface 24 extends above mouth 12 of groove 10. Second and fourth arcual surfaces 28, 30 each are in contact with the base 18 of groove 10, while at least a portion of third arcual surface 34 is not in contact with base 18. The concave third arcual surface 34 acts to push second and fourth arcual surfaces 28, 30 against groove side walls 14 and 16, respectively, when the seal is compressed, i.e., when pressure is applied downward on first arcual surface 24 during use. This acts to stabilize or lock the seal into position in groove 10 and extends its service life. Preferably, there is at least some free space between the groove side walls 14 and 16 and the second and fourth arcual surfaces of the seal to allow for thermal expansion.

It is well know that rubber and other elastomers expand on heating. Third arcual surface 34 also provides some free space in which the seal can expand within groove 10 at high temperatures. Otherwise, thermal expansion could force some of the rubber out of groove 10 at high temperatures, thus causing the seal to fail. Fifth arcual surface 32 is sized so that it is below mouth 12 when the seal is positioned in groove 10. As will be explained below, another factor in sizing fifth arcual surface 32 is the shape of mouth 12 (see FIG. 3). Fifth arcual surface 32 aids in installation of the seal into a groove when arcual surface 32 is shaped and sized for mating engagement with groove side wall 16 at mouth 12. The shape of arcual surface 32 need not be an exact fit with the mouth of the groove for mating engagement with the groove side wall 16 but there must be sufficient complementary engagement to prevent leaks when the seal element is compressed under use conditions.

Installation of the seal element of the present invention into a dovetail shaped groove is shown in FIG. 3. First, the surface of the fifth convex arcual surface 32 of seal 22 is positioned against groove side wall 16 at mouth 12. The seal 22 is rotated in the direction of the arrow until the seal's flat portion 26 is partially within groove 10. Downward pressure is then applied to the first arcual surface 24 of seal 22 until second and fourth arcual surfaces 28, 30 are in contact with the base 18 of groove 10. Arcual surfaces 24, 28 and 30 are shown in FIG. 2. In this way, the seal element of the present invention may be installed without tearing and without causing portions of the seal to be twisted within the groove. Such seals provide excellent sealing performance in semi-dynamic sealing applications and have long lifetimes in use because minimal damage or stress is inflicted on the seal during installation and use.

The seal element of the present invention may be manufactured in a number of ways including molding and extrusion. If the latter method is used, manufacture includes subsequent splicing or joining of ends into an annular seal. If the method of manufacture is molding, the mold is designed so that parting lines (i.e. the slight imperfection on the surface of the seal caused by flow of uncured rubber in the region where the top and bottom halves of the mold meet) will be below mouth 12 of groove 10 when the seal is in use.

The seal may be fashioned out of an elastomer or other deformable materials such as a thermoplastic resin (e.g. polytetrafluoroethylene or polyethylene) that is inert to the temperatures and fluids to which the seal will be exposed in use.

Suitable elastomers include ethylene-propylene-diene elastomers (EPDM), silicone rubbers, fluorosilicone rubbers, fluoroelastomers, and perfluoroelastomers. For applications requiring seals that may be exposed to high temperature or harsh chemicals, a perfluoroelastomer is the preferred elastomer. By "perfluoroelastomer" is meant copolymers comprising units of tetrafluoroethylene and units of a perfluoro(alkyl vinyl ether) or a perfluoro(alkoxy vinyl ether). Such copolymers may also contain a minor amount (preferably less than 7 mole percent, based on the total number of moles of comonomers) of a cure site such as Br, I, CN, or H. Perfluoroelastomers have been extensively described in the prior art. See, for example, U.S. Pat. Nos. 4,035,565; 4,281,092; 4,529,784; 4,487,903; 5,789,489; 5,936,060; and European Patent No. 872495.

Typically useful perfluoroelastomers for forming seal 22, are polymeric compositions having copolymerized units of at least two principal perfluorinated monomers. Generally, one of the principal comonomers is a perfluoroolefin while the other is a perfluorovinyl ether. Representative perfluorinated olefins include tetrafluoroethylene and hexafluoropropylene. Suitable perfluorinated vinyl ethers are those of the formula

$$CF_2=CFO—(R_f'O)_n(R_{f''O})_mR_f \qquad (I)$$

where $R_f'$ and $R_f''$ are different linear or branched perfluoroalkylene groups of 2–6 carbon atoms, m and n are independently 0–10, and $R_f$ is a perfluoroalkyl group of 1–6 carbon atoms.

A preferred class of perfluoro(alkyl vinyl) ethers includes compositions of the formula

$$CF_2=CFO(CF_2CFXO)_nR_f \qquad (II)$$

where X is F or $CF_3$, n is 0–5, and $R_f$ is a perfluoroalkyl group of 1–6 carbon atoms.

Most preferred perfluoro(alkyl vinyl) ethers are those wherein n is 0 or 1 and $R_f$ contains 1–3 carbon atoms. Examples of such perfluorinated ethers include perfluoro (methyl vinyl) ether and perfluoro(propyl vinyl) ether. Other useful monomers include compounds of the formula

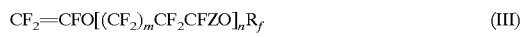

$$CF_2=CFO[(CF_2)_mCF_2CFZO]_nR_f \qquad (III)$$

where $R_f$ is a perfluoroalkyl group having 1–6 carbon atoms, m=0 or 1, n=0–5, and Z=F or $CF_3$.

Preferred members of this class are those in which $R_f$ is $C_3F_7$, m=0, and n=1. Additional perfluoro(alkyl vinyl) ether monomers include compounds of the formula

$$CF_2=CFO[(CF_2CFCF_3O)_n(CF_2CF_2CF_2O)_m(CF_2)_p]C_xF_{2x+1} \qquad (IV)$$

where m and n=1–10, p=0–3, and x=1–5.

Preferred members of this class include compounds where n=0–1, m=0–1, and x=1.

Examples of useful perfluoro(alkoxy vinyl) ethers include

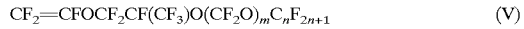

$$CF_2=CFOCF_2CF(CF_3)O(CF_2O)_mC_nF_{2n+1} \qquad (V)$$

where n=1–5, m=1–3, and where, preferably, n=1.

Mixtures of perfluoro(alkyl vinyl) ethers and perfluoro (alkoxy vinyl) ethers may also be used.

Preferred copolymers are composed of tetrafluoroethylene and at least one perfluoro(alkyl vinyl) ether as principal monomer units. In such copolymers, the copolymerized perfluorinated ether units constitute from about 15–50 mole percent of total monomer units in the polymer.

Typically, the perfluoropolymer further contains copolymerized units of at least one cure site monomer, generally in amount of from 0.1–5 mole percent. The range is preferably between 0.3–1.5 mole percent. Although more than one type of cure site monomer may be present, most commonly one cure site monomer is used and it contains at least one nitrile substituent group. Suitable cure site monomers include nitrile-containing fluorinated olefins and nitrile-containing fluorinated vinyl ethers. Useful cyano-substituted cure site monomers include those of the formulas shown below.

$$CF_2=CF-O(CF_2)_n-CN \quad (VI)$$

where n=2–12, preferably 2–6;

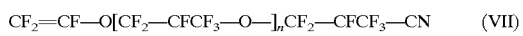
$$CF_2=CF-O[CF_2-CFCF_3-O-]_nCF_2-CFCF_3-CN \quad (VII)$$

where n=0–4, preferably 0–2;

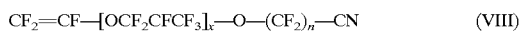
$$CF_2=CF-[OCF_2CFCF_3]_x-O-(CF_2)_n-CN \quad (VIII)$$

where x=1–2, and n=1–4;

$$CF_2=CF-O-(CF_2)_n-O-CF(CF_3)CN \quad (IX)$$

where n=2–5; and

$$CF_2=CF[OCF_2CF(CF_3)]_nCN \quad (X)$$

where n=1–5.

Those of formula (VIII) are preferred. Especially preferred cure site monomers are perfluorinated polyethers having a nitrile group and a trifluorovinyl ether group. A most preferred cure site monomer is

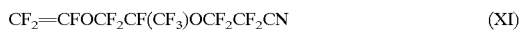
$$CF_2=CFOCF_2CF(CF_3)OCF_2CF_2CN \quad (XI)$$

i.e. perfluoro(8-cyano-5-methyl-3,6-dioxa-1-octene) or 8-CNVE.

Other cure site monomers include olefins represented by the formula $R_1CH=CR_2R_3$, wherein $R_1$ and $R_2$ are independently selected from hydrogen and fluorine and $R_3$ is independently selected from hydrogen, fluorine, alkyl, and perfluoroalkyl. The perfluoroalkyl group may contain up to about 12 carbon atoms. However, perfluoroalkyl groups of up to 4 carbon atoms are preferred. In addition, the cure site monomer preferably has no more than three hydrogen atoms. Examples of such olefins include ethylene, vinylidene fluoride, vinyl fluoride, trifluoroethylene, 1-hydropentafluoropropene, and 2-hydropentafluoropropene. Additional cure site monomers include bromine-containing and iodine-containing olefins or vinyl ethers such as 4-bromo-3,3,4,4,tetrafluorobutene-1. Also, bromine or iodine atoms located at the terminal ends of the copolymer chains may act as cure sites. Such sites are formed when a bromine or iodine containing chain transfer agent is used in the polymerization of the copolymer.

What is claimed is:

1. A seal for installation into an annular groove of dovetail configuration, said groove having a mouth, two side walls depending from said mouth and extending away from each other and a base wall connecting the two side walls thereby forming the dovetail configuration;

said seal in cross section comprising an element having a multi-arcual surface and a substantially flat surface;

said multi-arcual surface comprising distinct first, second and third convex arcual surfaces;

said first convex arcual surface of the seal being sized and shaped for positioning in the mouth of the annular groove of the dovetail configuration so that, while not under compression, a portion of said first convex arcual surface extends above the mouth of the annular groove of dovetail configuration when the seal is seated in said groove; said first convex arcual surface being directly connected to the substantially flat surface; said substantially flat surface being directly connected to said second arcual convex surface; said second convex arcual surface being in turn directly connected to a first concave arcual surface; said first concave arcual surface being in turn directly connected to said third convex arcual surface; said second and third convex arcual surfaces being shaped and sized so as to be in contact with the base wall of the annular groove of the dovetail configuration and said first concave arcual surface being shaped and sized so that a portion is not in contact with the base wall of the annual groove when the seal is seated in said groove; and said third convex arcual surface and said first convex arcual surface being directly connected by a second concave arcual surface; the region defined by said second concave arcual surface forming an insertion surface of approximate complementary shape to the mouth of said annular groove for mating engagement with a side wall of said annular groove during insertion of the seal into said groove.

2. The seal of claim 1 in which the first convex arcual surface having a center in the cross section and a radius $R_1$; and the second convex arcual surface having a center in the cross section and a radius $R_2$; and the third convex arcual surface having a center in the cross section and a radius $R_4$ wherein radius $R_1$ is greater than radii $R_2$ or $R_4$ and $R_2$ and $R_4$ are of substantially similar length.

3. The seal of claim 2 in which the centers of the first, second and third convex arcual surfaces form the points of a triangle with the apex of the triangle being the center of the first convex arcual surface.

4. The seal of claim 3 in which the length of the first convex arcual surface is greater than either of the second and third convex arcual surfaces.

5. The seal of claim 1 in which the seal is formed from a material selected from the group consisting of ethylene-propylene-diene elastomers, silicone rubbers, fluorosilicone rubbers, fluoroelastomers and perfluoroelastomers.

6. The seal of claim 5 in which the seal is formed from a perfluoroelastomer selected from the group consisting of a copolymer comprising units of tetrafluoroethylene and units of a perfluoro(alkyl vinyl ether) and a copolymer comprising units of tetrafluoroethylene and units of a perfluoro(alkoxy vinyl ether).

* * * * *